(12) United States Patent
Lei

(10) Patent No.: US 9,886,481 B2
(45) Date of Patent: *Feb. 6, 2018

(54) QUERY OPTIMIZATION ON VPD PROTECTED COLUMNS

(75) Inventor: Chon Hei Lei, Alameda, CA (US)

(73) Assignee: Oracle International Corporation, Redwood Shores, CA (US)

(*) Notice: Subject to any disclaimer, the term of this patent is extended or adjusted under 35 U.S.C. 154(b) by 928 days.

This patent is subject to a terminal disclaimer.

(21) Appl. No.: 13/278,095

(22) Filed: Oct. 20, 2011

(65) Prior Publication Data

US 2012/0095988 A1  Apr. 19, 2012

Related U.S. Application Data

(63) Continuation of application No. 11/764,470, filed on Jun. 18, 2007, now Pat. No. 8,065,329.

(51) Int. Cl.
*G06F 17/30* (2006.01)
*G06F 21/62* (2013.01)

(52) U.S. Cl.
CPC .. *G06F 17/30442* (2013.01); *G06F 17/30427* (2013.01); *G06F 21/6227* (2013.01); *G06F 17/30389* (2013.01); *G06F 17/30448* (2013.01)

(58) Field of Classification Search
CPC .......... G06F 21/6227; G06F 17/30427; G06F 17/30306; G06F 17/30448; G06F 17/30389; G06F 2221/2141
USPC ........ 707/1, 2, 3, 9, 10, 104, 616, 662, 714, 707/781, 783
See application file for complete search history.

(56) References Cited

U.S. PATENT DOCUMENTS

| | | | |
|---|---|---|---|
| 6,820,082 B1* | 11/2004 | Cook et al. | 707/754 |
| 6,983,275 B2 | 1/2006 | Agrawal et al. | |
| 6,985,948 B2* | 1/2006 | Taguchi et al. | 709/225 |
| 7,171,413 B2* | 1/2007 | Puz et al. | 707/999.009 |
| 7,216,126 B2 | 5/2007 | Choy | |
| 7,243,097 B1* | 7/2007 | Agrawal et al. | 707/999.003 |
| 7,433,870 B2* | 10/2008 | Chan et al. | 707/999.009 |
| 7,464,080 B2 | 12/2008 | Cotner et al. | |
| 7,584,178 B2 | 9/2009 | Dettinger et al. | |
| 7,599,937 B2* | 10/2009 | Dutta et al. | 707/999.002 |
| 7,685,437 B2 | 3/2010 | Hacigumus et al. | |
| 7,743,069 B2* | 6/2010 | Chitkara et al. | 707/781 |
| 7,792,851 B2* | 9/2010 | Berg et al. | 707/759 |
| 7,797,342 B2* | 9/2010 | Banks et al. | 707/783 |
| 7,958,150 B2* | 6/2011 | Bird | 707/785 |
| 8,019,750 B2* | 9/2011 | Kosciusko et al. | 707/718 |

(Continued)

*Primary Examiner* — Dangelino Gortayo
(74) *Attorney, Agent, or Firm* — Hickman Palermo Becker Bingham LLP

(57) ABSTRACT

A method and apparatus for preserving optimization hints in a transformed query is provided. In one embodiment, the methodology is implemented by query optimization logic. Upon receiving a first query to access values in a column of a table protected by an access control policy, the query optimization logic creates a second query that is equivalent to the first query as subject to the access control policy. Furthermore, the second query contains a new predicate that conjunctively joins a clone of a first expression in a predicate of the first query with a second expression that is derived, based on the access control policy, from the first expression. In one embodiment, the query optimization logic submits the second query for execution.

18 Claims, 4 Drawing Sheets

```
SELECT name, SSN, phone_number, address   ⎫ Q1
FROM Employee                              ⎬ (102)
WHERE SSN LIKE "123%";                     ⎭
         ╲_____ _____╱
             112 First Expression
     ╲_____ _____╱
             114 First Predicate SELECT name, SSN, phone_number, address
FROM (SELECT, name,(case when emp_num =
    12345 then SSN else null) SSN,
    phone_number, address, SSN XYZ            ⎫ EQ3
    FROM Employee)                            ⎬ (116)
WHERE SSN LIKE "123%" AND XYZ LIKE "123%";   ⎭
         ╲_____ _____╱   ╲_____ _____╱
           122 Second          120 Clone of the
           Expression          First Expression
     ╲_____ _____╱
             118 Second Predicate
```

(56) References Cited

U.S. PATENT DOCUMENTS

| | | |
|---|---|---|
| 8,126,890 B2 * | 2/2012 | Bobick et al. ................. 707/736 |
| 8,516,538 B2 * | 8/2013 | Akeel et al. ....................... 726/1 |
| 2003/0014394 A1 | 1/2003 | Fujiwarea et al. |
| 2006/0248592 A1 * | 11/2006 | Agrawal et al. ................. 726/26 |
| 2007/0055658 A1 | 3/2007 | Hsiao et al. |
| 2007/0174285 A1 | 7/2007 | Dutta et al. |
| 2008/0189258 A1 | 8/2008 | Miejer et al. |
| 2008/0189758 A1 * | 8/2008 | Akeel et al. ....................... 726/1 |
| 2008/0263006 A1 | 10/2008 | Wolber et al. |

* cited by examiner

```
SELECT name, SSN, phone_number, address  ⎫  Q1
FROM Employee                            ⎬  (102)
WHERE SSN LIKE "123%";                   ⎭
      _____/
       112 First Expression
_____/
       114 First Predicate
```

```
SELECT name, SSN, phone_number, address        ⎫
FROM (SELECT, name,(case when emp_num =        ⎪
      12345 then SSN else null) SSN,           ⎬ EQ3
      phone_number, address, SSN XYZ           ⎪ (116)
         FROM Employee)                        ⎪
WHERE SSN LIKE "123%" AND XYZ LIKE "123%";     ⎭
      _____/     _____/
         122 Second           120 Clone of the
         Expression           First Expression
      _____/
                 118 Second Predicate
```

FIG. 1B

QUERY OPTIMIZATION ON VPD PROTECTED COLUMNS

CLAIM OF PRIORITY

This application claims priority as a continuation of U.S. patent application Ser. No. 11/764,470, filed Jun. 18, 2007, now U.S. Pat. No. 8,065,329 titled "QUERY OPTIMIZATION ON VPD PROTECTED COLUMNS," the entire contents of which are incorporated by reference herein in their entirety.

FIELD OF THE INVENTION

The present invention relates to database systems and, more specifically, database systems that optimize queries relating to tables that are subject to access control policies.

BACKGROUND

Some database systems provide fine-grain access control at an individual row level and/or at an individual column level. Rather than opening up an entire table to any individual user who gains privileges on all rows in the table, row-level security restricts access to specific rows in a table. The result is that any individual user sees a completely different set of data from the same table or view—only the data that person is authorized to see. For example, a manager of a department (e.g., dept_num=50) may be authorized to view privileged information (such as social security numbers) relating to employees in that department, but may be prevented from viewing the same type of privileged information relating to another department (i.e., dept_num!=50). Similarly, a non-management employee (e.g., emp_num=12345) may be authorized to view privileged information relating to the employee, but may be prevented from viewing the same type of privileged information relating to another employee (i.e., emp_num!=12345).

One approach to provide row-level access control is to automatically generate, based on a user-submitted query, an equivalent query that uses conditional expressions based on a user's credentials (or user's security context). For example, a field "SSN" might be a protected column (i.e., privileged information) in a table "Employee". Under such circumstances, one or more values (in certain rows of the Employee table) in that column cannot be accessed unless the user who submits the original query is authorized to do so.

Now, a user such as the manager of the present example may issue a query (Q1) as follows:

```
SELECT name, SSN, phone_number, address
FROM Employee
WHERE SSN LIKE "123%";
```

After this "Q1" query is submitted, a new query that is equivalent to the "Q1" query as subject to an access control policy may be automatically created. Specifically, for the manager, the text that indicates the protected column "SSN", as specified in the above query, turns into a case statement (i.e., a type of conditional expression) as indicated in an equivalent query (EQ1) as follows:

```
SELECT name, SSN, phone_number, address
FROM (SELECT name,(case when dept_num = 50 then SSN else
       null) SSN, phone_number, address
   FROM Employee)
WHERE SSN like "123%";
```

This equivalent query may actually be submitted in place of the "Q1" query to yield a query result that only displays values of the "SSN" column for employees in the department (i.e., dept_num=50) whose privileged information the manager is authorized to view. In this manner, each user (including, for example, the non-management employee previously discussed) may have a different equivalent query, thereby obtaining a different result, relative to the same "Q1" based on each user's security context.

However, once certain columns in the original queries are substituted by conditional expressions in equivalent queries, a database system may lose track of hints contained in original queries. These hints would ordinarily enable the database system to select a less costly query plan, such as a query using an existing index to access rows in an efficient manner. For instance, in the above example, there may be an index on the "SSN" column of the "Employee" table. Since the "WHERE" clause in the original, unmodified query includes the "SSN" column, the database system would be likely to access rows of the table using the index on the "SSN" column, if the original, unmodified query were submitted for execution and if the Employee table were not subject to an access control policy. However, since the original query is replaced by a new equivalent query to enforce the access control policy, even though the equivalent query still refers to an "SSN" field, the "SSN" field in the new equivalent query is a mere alias for a case statement, not for any column in a underlying table. As a result, the equivalent query may be executed with a full table scan on the Employee table, causing significant inefficiency.

Therefore, a better mechanism, which would better optimize queries that are subject to access control policies, is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a diagram illustrating an original query and a new query in accordance with an embodiment of the present invention.

DETAILED DESCRIPTION

Figure 1A:
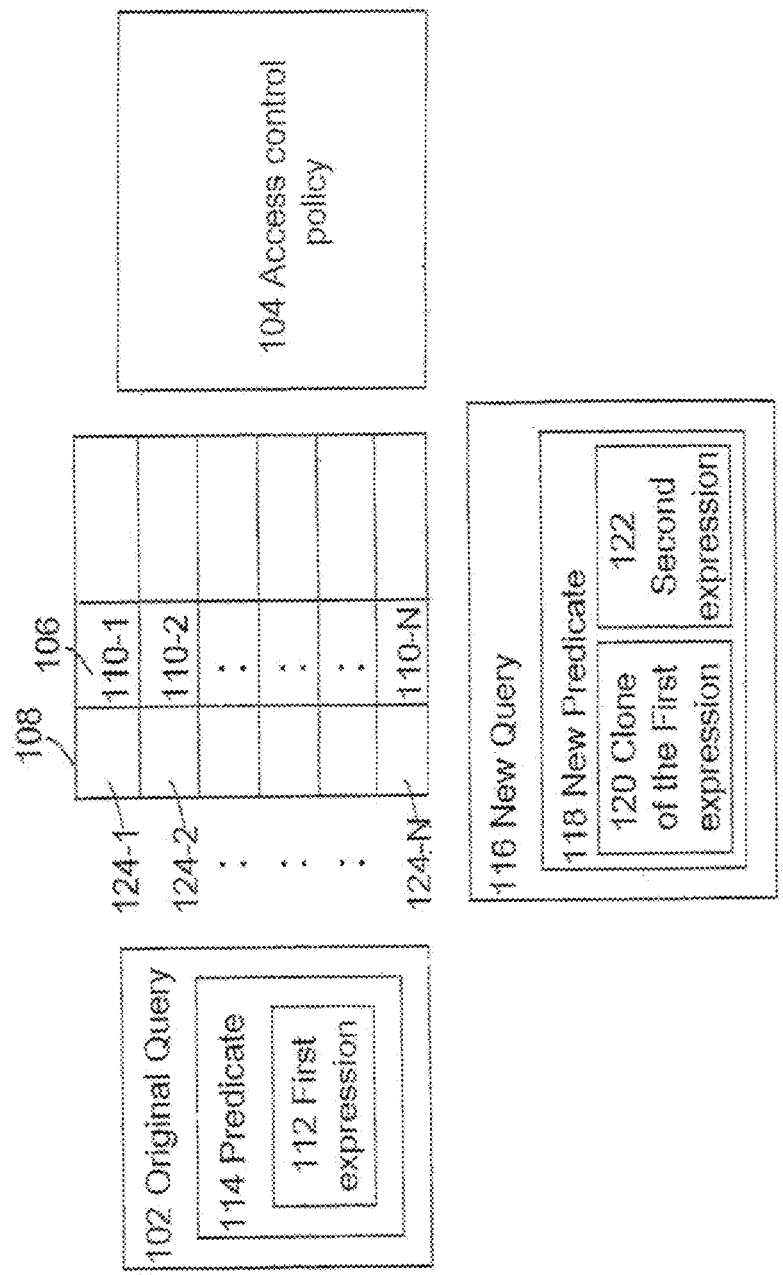
FIG. 1A is a block diagram of an example model in accordance with an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, query optimization logic may be implemented in a database system to work in conjunction with an (existing) optimization engine in the database system. In some embodiments, the optimization engine in the database system may be able to determine whether an optimized query plan can be created to take advantage of an existing index on a protected column specified in the predicate of the original query, if such a protected column is specified in the predicate.

In accordance with an embodiment of the present invention, a new query that is equivalent to the original query, as subject to an access control policy, may be created by the query optimization logic. This new query comprises a new predicate. This new predicate conjunctively joins a clone of the expression in the predicate of the original query with a new expression that enforces the access control policy (which in turn protects the protected column specified in the predicate of the original query). The new expression may be a conditional expression that is derived, based on the access control policy, from the expression in the predicate of the original query.

Under this approach, a predicate in an original query can be converted into a new predicate, in a new equivalent query, that uses a case statement in place of a column in an underlying table. This conversion may be performed even if the column is protected and has an index that can be used for optimized access. Since the new predicate also contains a clone of an expression in the original query, the new query preserves sufficient hints for the optimization engine to create an optimized query plan later on (e.g., at a subsequent stage of processing the query).

In this manner, a user-inputted query that involves access to protected columns may be executed by the database system in an efficient manner because existing indexes on protected columns may still be determined as usable.

Besides the benefit discussed above, this approach also ensures a semantically equivalent result as compared with a query (equivalent to an original query that is subject to an access control policy) that merely enforces the access control policy but does so without preserving hints in the original query for optimization.

The mechanism in various embodiments of the invention may be used regardless of the format and data structures used to store the user data. For example, the user data can reside in structures, in any form, such as SQL tables, object-relational tables, files, etc. The mechanism may also be used regardless of the types of user data stored such as basic data types, complex data types, opaque data types, a combination thereof, etc.

Access Control Policy

In accordance with an embodiment of the present invention, query optimization logic may be implemented in a database system to optimize queries that are subject to access control policies. As used herein, the term "access control policies" refers to a database system that supports row-level security policies. In some embodiments, one or more columns of a table may be subject to an access control policy. For simplicity, such columns will be called protected columns. Under the access control policy, one or more values in a protected column may be accessed by a user only if the user is associated with, or is authenticated to have, a credential (or security context) that authorizes the user to access these values in the protected column. In some embodiment, different users may be associated with different security contexts, and thus may be allowed to access different sets of values in the protected column under the access control policy.

Equivalent Queries

As noted, in some embodiments, even though a plurality of users may submit (or input) the same query (e.g., Q1 as illustrated in FIG. 1B) into the database system, such a query may turn into a plurality of equivalent queries which differ among the plurality of users. For example, where two different users, such as the manager and the non-management employee in the previous example, input a query with the same expression (e.g., Q1), the query (i.e., Q1) entered by the two different users may be converted into two different equivalent queries that are associated with the two different users, respectively. The equivalent query for the manager is equivalent to the original inputted query, as subject to the access control policy as specifically applied to the manager. In contrast, the (different) equivalent query for the non-management employee is equivalent to the original inputted query, as subject to the access control policy as specifically applied to the non-management employee.

As an example, each row in the Employee table might correspond to a separate employee. The non-management employee might have an emp_num of "12345". The access control policy, to which the Employee table is subject, might specify that the non-management employee may only access a value of the column "SSN" in a row where a value of the "emp_num" column in the same row matches the non-management employee's emp_num.

Then, in the case of the non-management employee, the query Q1 may be converted into a different query (EQ2) as follows:

```
SELECT name, SSN, phone_number, address
FROM (SELECT name,(case when emp_num = 12345 then SSN
        else null) SSN, phone_number, address
    FROM Employee)
WHERE SSN LIKE "123%";
```

As illustrated, even though the manager and the employee enter the same query Q1, the equivalent queries for the two users have two different expressions, i.e., EQ1 and EQ2. Specifically, the SSN field in EQ1 yields all values in the column "SSN" where values of the column "dept_num" (in one or more rows of the Employee table) match 50. On the other hand, the same SSN field in EQ2 yields only one value in the column "SSN" where the value of the column "emp_num" matches "12345".

Example Model

To further illustrate how the query optimization logic may operate in accordance with an embodiment of the present invention, reference will be made to FIG. 1A, which illustrates an example model of preserving hints in user-submitted queries for optimization, and FIG. 1B, which illustrates a concrete example of queries involved. In an embodiment, the query optimization logic receives an (original) query 102 inputted by a user. The query optimization logic determines that query 102 is subject to an access control policy 104. Under access control policy 104, a column 106 (of a table 108) that stores one or more values 110 in the database system may be protected. Before providing the query 102 directly to the database system (or the database system's optimization engine) for execution, the query optimization logic may first identify a first expression 112 (as shown in FIG. 1A and FIG. 1B) in a predicate 114 (as shown in FIG. 1A and FIG. 1B) of original query 102 as one that includes the protected column 106 (in first expression 112).

Subsequently, the query optimization logic creates a new query 116 (as illustrated in FIG. A and FIG. B). New query 116 is equivalent to original query 102 as subject to access control policy 104. In some embodiments, this new query 116 contains new expressions (e.g., conditional expressions that are automatically generated based on a user's security context and original expressions in the original query) that enforce access control policy 104 on protected column 106 with respect to the user who submits original query 102 for execution. In some embodiments, new query 116 with the new expressions is a complete representation of, and produces the same effects as, original query 102 as subject to access control policy 104. Thus, this new query 116 can be executed by the database system without any further regards to access control policy 104, but will only provide access to the values that the user is permitted to access under access control policy 104.

In accordance with an embodiment of the present invention, new query 116 has a new predicate 118 (as shown in FIG. 1A and FIG. 1B). This new predicate 118 conjunctively joins a clone 120 (as shown in FIG. 1A and FIG. 1B) of first expression 112 in original query 102 with a new second expression 122 (as illustrated in FIG. 1A and FIG. 1B) that is derived, based on the access control policy 104, from first expression 112 in original query 102. This new expression 122, which is conjunctively joined with clone 120 of first expression 112 in original query 102, may, for example, be a conditional expression that yields values only if certain conditions are met. For example, this expression 122 may yield a protected value 110 for protected column 106, such as the "SSN" column as previously discussed, only if a row 124 containing such a protected value 110 also a "dept_num" column (not shown) value of 50, which may be a condition set forth in access control policy 104.

Example Optimized Query

In accordance with an embodiment of the present invention, the query optimization logic turns an original query, as subject to an access control policy, into an equivalent query that enforces the access control policy (as applied to the user who submitted the original query) and preserves optimization hints in the original query. Thus, in the previous example of the Employee table, in the case of a user being the manager, original query 102 of FIG. 1A is Q1. Original query 102 (Q1) contains an predicate 114 in Q1 as follows:
WHERE SSN LIKE "123%"
This predicate 114 contains first expression 112 in the form of "SSN LIKE '123%'". If Q1 were to be executed by the database system as-is, without being subject to any access control policy, then the optimization engine in the database system would typically determine that this original query 102 contains a predicate that include the column "SSN". Accordingly, if there were an index on the column "SSN", as there is in this case, then the optimization engine would formulate a query execution plan that makes use of the index on that column.

However, since the Employee table is one of those tables (or views) that are subject to access control, Q1 will not be executed as-is. Rather, for the purpose of carrying out an access control policy such as 104 of FIG. 1A, the database system may turn Q1 into an equivalent query EQ1 that produces the same effects as does the query Q1 as subject to access control policy 104. As can be seen in EQ1, the "SSN" field in the predicate of EQ1 refers to a conditional expression as follows:
(case when emp_num=12345 then SSN else null) SSN
That is, the "SSN" field in the predicate of EQ1 now refers to an alias for a conditional expression "(case when emp_num=12345 then SSN else null)". Unfortunately, this alias provides little or no hint to the optimization engine that access to rows in Employee table, or in the view (i.e., "(SELECT name,(case when dept_num=50 then SSN else null) SSN, phone_number, address FROM Employee)") that replaces the Employee table, can be made using an index on the protected column.

In accordance with an embodiment of the present invention, the query optimization logic instead turns original query 102 (i.e., Q1 in this example), as subject to access control policy 104, into an equivalent query that enforces access control policy 104 and preserves optimization hints in original query 102. Thus, in the present example of the Employee table, in the case of a user being the manager, original query 102 of FIG. 1A (Q1) may be turned into an equivalent query (new query 116 of FIG. 1A or EQ3 of FIG. 1B) as follows:

```
SELECT name, SSN, phone_number, address
FROM (SELECT, name,(case when emp_num = 12345 then SSN
    else null) SSN, phone_number, address, SSN XYZ
    FROM Employee)
WHERE SSN LIKE "123%" AND XYZ LIKE "123%";
```

As illustrated, this new query 116 contains a new predicate "WHERE SSN LIKE '123%' AND XYZ LIKE '123%'". This new predicate conjunctively joins clone 120 (i.e., "XYZ LIKE '123%'" in EQ3) of first expression 112 (i.e., "SSN LIKE '123%'" in Q1) with second expression 122 (i.e., "SSN LIKE '123%' in EQ3). This second expression 122 is semantically quite different from first expression 112 in the original query Q1, even though both refer to an "SSN" field. This is so because the "SSN" field in second expression 122 refers to a conditional expression rather than the "SSN" column in the underlying table (i.e., the Employee table). As such, second expression 122 is deemed as derived, based on the access policy, from the first expression 112.

Even though the "SSN" field in the predicate now refers to an alias for a conditional expression as previously discussed, the original "SSN" column has been aliased to a new name "XYZ" in EQ3. Since the new name "XYZ" directly refers to the "SSN" column of the underlying table, the hint that the access to the underlying table may be performed using the existing index on that table is preserved intact. Accordingly, instead of resorting to a full-table scan, as would be likely for the equivalent query EQ1, the optimization engine may use a query execution plan that accesses the rows of the underlying table in an efficient manner by way of the existing index.

Not only does new query 116 (EQ3) preserve optimization hints from the original query 102, but the new query 116 also produces a semantically equivalent result to a query (such as EQ1) that is equivalent to original query 102 as subject to access control policy 104. This is so because new predicate 118 conjunctively joins clone 120 of first expression 112 with second expression 122. Therefore, in one embodiment, new predicate 118 cannot possibly be evaluated to "true" unless second expression 122, which enforces the access control policy, is evaluated to "true". However, in one embodiment of the invention, since second expression 122 is evaluated to "true" only for a set of values that are accessible by the user, which set is a subset of all the values that clone 120 of first expression 112 evaluates to "true", predicate 118 will be evaluated to true if and only if second expression 122 is evaluated to "true". Thus, new query 116, like EQ1, is also equivalent to original query 102 as subject to access control policy 104.

Sample Operation

Figure 2:
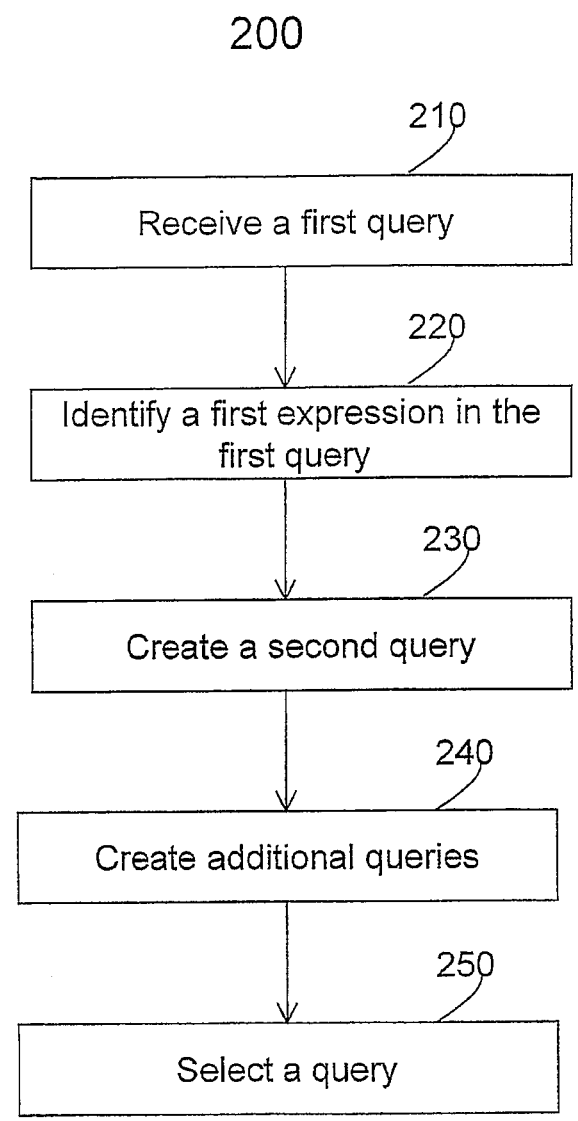
FIG. 2 is a flow diagram that illustrates a process for optimizing a query to a table that is subject to an access control policy, according to an embodiment of the present invention.

FIG. 2 shows a process flow 200 which provides a high level overview of the methodology according to one embodiment of the invention. Initially, the query optimization logic, which may be implemented as a part of the database system previously discussed, receives a first query against one or more tables in the database system (step 210 of FIG. 2). For example, this query may be inputted by a user at a user input device that is associated with a user interface.

In some embodiments, the database system restricts/controls access to some tables. As used herein, the term "table" refers to both "table" or a "view" that the database system stores or defines. As noted earlier, access control may be enforced by the database system at row levels against one or more columns of a certain table using an access control policy. Thus, when a query, such as the first query in this example, is issued against a table to which access is controlled, the query is subject to the access control policy. The access control policy may define an action (e.g., "permit" or "deny") for certain roles or groups. Additionally or alternatively, the access control policy may define an action that depends on whether or not one or more conditions are met (e.g., permit or deny access depending on whether or not a logical expression is evaluated to be "true").

At step 220 of FIG. 2, upon receiving the first query, the query optimization logic identifies a first expression in a first predicate of the first query. The first expression identifies a column of a table among the one or more tables. Access to the column of that table is subject to an access control policy. Thus, the first query is subject to the access control policy because the first query contains the first expression, which identifies the protected column.

Due to the access control policy, the user's access to one or more values stored in the column is protected. In other words, the access control policy may set forth certain specified conditions that the user's credential needs to meet before a value stored in the column will be provided in the query result. For example, a user, such as the manager in the earlier example, may be permitted to access a value in the "SSN" column in a row where the department number (i.e., dept_num) is 50. Thus, each different user may be permitted to access a different subset (including empty subsets) of the one or more values that are stored in the protected column.

In some embodiments, where a particular value that is stored in the protected column cannot be provided in the query result due to a failure of the user's credential to meet the specified conditions, a null value is supplied, in the query result, in place of the particular value in the query result. However, other values in the row that contains the non-accessible value may still be provided in the query result.

At step 230 of FIG. 2, the query optimization logic creates a second query that is equivalent to the first query as subject to the access control policy. To preserve optimization hints in the first query, the second query has a second predicate that conjunctively joins a clone of the first expression with a second expression that is derived, based on the access control policy, from the first expression. For example, an index might have been created on the column that is restricted under the access control policy. The first predicate, by including the protected column in the first expression, might provide to the optimization engine of the database system hints to use such an existing index on the column. The index may be, but is not limited to, a simple index that involves the protected column alone. For example, the index may be a composite index that involves one or more of the table's columns including the protected column.

In some embodiments, the clone of the first expression includes a randomized name. For example, the clone may be in the form of an alias "XYZ", as in EQ3, for the true "SSN" column of the table that is subject to the access control policy. Here, the name "XYZ" may be any text string, as long as the name constitutes an acceptable alias according to naming conventions adopted by the database system. As noted, to reduce the probability of an accidental match of the alias name with another text symbol in the second query, the alias name for the protected column may be randomized (e.g., each time when the query optimization logic produces an optimized query such as EQ3, the alias name is randomized anew). The alias name, as randomized, also reduces the probability of being attacked by a hacker on the protected column because the alias name can be randomized to a point where the probability of accidental match is negligible (e.g., less than one in a billion chance).

At step 240 of FIG. 2, one or more additional queries may be created by the query optimization logic or another entity (e.g., by the optimization engine following receipt of the second query from the query optimization logic). Each of the additional queries enforces the access control policy and is semantically equivalent to the first query as subject to the access control policy.

At step 250 of FIG. 2, the database system (which may actually delegate the present step to the query optimization logic or another entity such as the optimization engine) selects a particular query for execution. The database system may select the particular query from a collection of (a) the second query and (b) the one or more additional queries. This selection of the particular query may be based on one or more factors (or criteria) including time required to execute, resource usages, resource availability, network access cost, disk access cost, etc. The particular query may be submitted to other logic elements in the database system for query execution.

In some embodiments, after results of the second query are produced, the database system performs at least one of: (a) storing the results of the second query and (b) presenting, to the user, the results of the second query.

The table or the first query here has been described as subject to one access control policy. This is for illustrative purposes only. In alternative embodiments of the invention, the table or the first query may also be subject to other additional access control policies. Furthermore, an access control policy may protect more than one column in a table in the database system. Thus, other variations of access control policies are within the scope of certain embodiments of the present invention.

The queries (Q1, EQ1, EQ2 and EQ3) here have been described as to be performed against one table. This is for illustrative purposes only. In alternative embodiments of the invention, each such query may be a subquery of a larger query. Additionally or alternatively, each such query may involve a union of two or more tables that include the table previously discussed. Thus, other variations of queries and other variations of the number of tables involved in the queries are within the scope of certain embodiments of the present invention.

Hardware Overview

Figure 3:
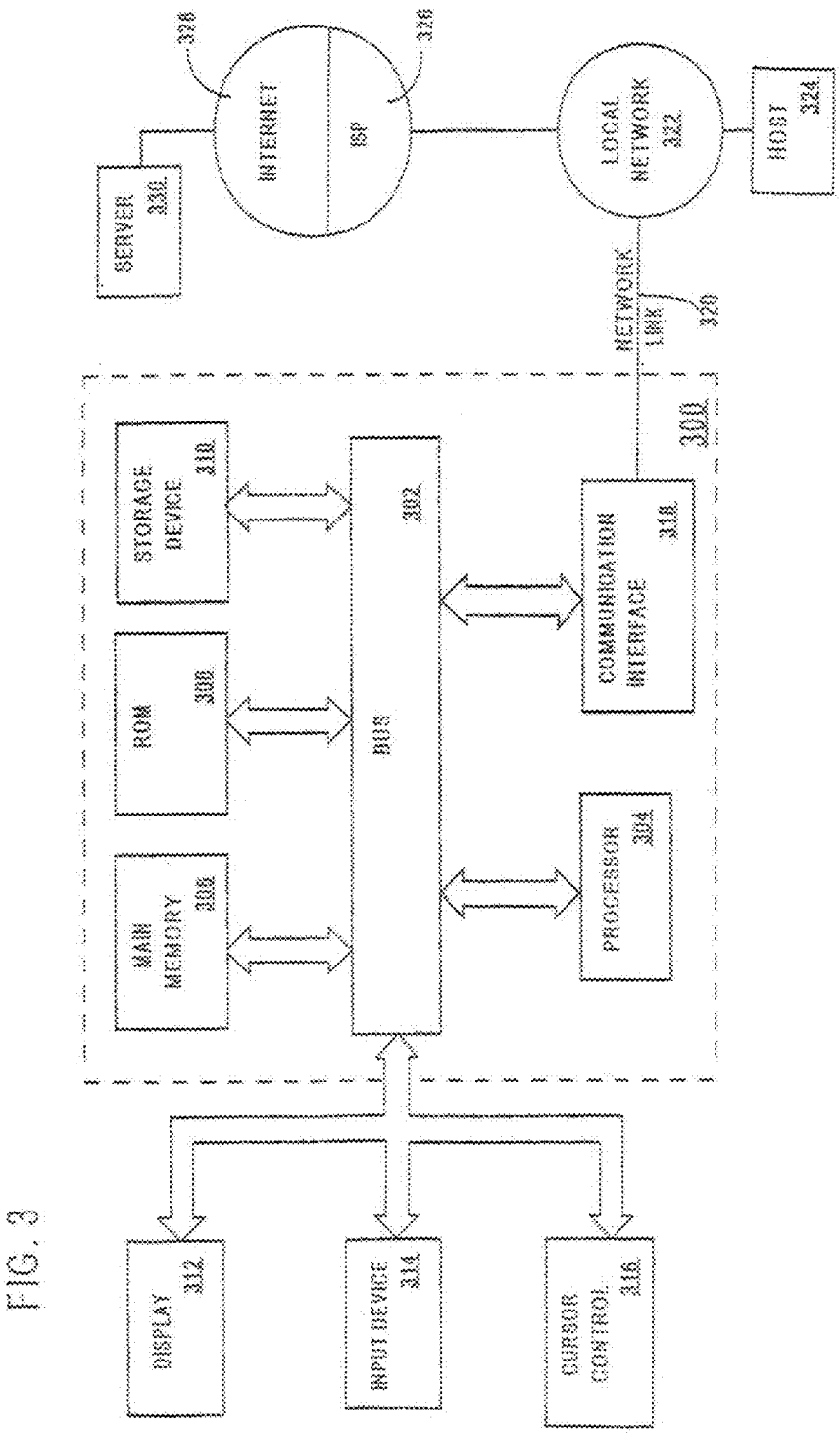
FIG. 3 is a block diagram of a system upon which the techniques described herein may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   identifying, in a first query, a first expression that includes a column name identifying a table column; and
   rewriting said first query to form a second query that includes a conditional expression that returns a value from the table column only when a condition is satisfied;
   wherein rewriting said first query to form said second query includes creating:
   (a) a second expression that includes a first alias that refers by said column name to said conditional expression, and
   (b) a third expression that includes a second alias that refers to said table column;
   wherein the method is performed by one or more computing devices.

2. The method of claim 1 further comprising, during execution of the second query, a query optimizer using an index existing on the table column.

3. The method of claim 1, wherein the second query includes a clone of the first expression that preserves hints for query optimization.

4. The method of claim 1, wherein the second query includes a predicate, and wherein the predicate conjunctively joins a clone of the first expression with the second expression that is derived based on both the first expression and an access control policy.

5. The method of claim 1, wherein the conditional expression returns null when the condition is not satisfied.

6. The method of claim 1, wherein the first alias has a same name as the table column, and wherein the conditional expression returns null when the condition is not satisfied.

7. The method of claim 1, wherein the conditional expression returns a value other than a value from the table column when the condition is not satisfied.

8. The method of claim 1, wherein the third expression is a clone of the first expression, wherein the second query includes a predicate that conjunctively joins the third expression with the second expression, wherein the second expression is based on both the first expression and an access control policy, wherein the first alias has a same name as the table column.

9. The method of claim 1, wherein the third expression is a clone of the first expression, wherein the second query includes a predicate that conjunctively joins the third expression with the second expression that is derived based on both the first expression and an access control policy, and wherein the conditional expression returns null when the condition is not satisfied.

10. A non-transitory computer-readable medium storing instructions which, when executed by one or more processors, cause:
    identifying, in a first query, a first expression that includes a column name identifying a table column; and
    rewriting said first query to form a second query that includes a conditional expression that returns a value from the table column only when a condition is satisfied;
    wherein rewriting said first query to form said second query includes creating:
    (a) a second expression that includes a first alias that refers by said column name to said conditional expression, and
    (b) a third expression that includes a second alias that refers to said table column.

11. The non-transitory computer-readable medium of claim 10, wherein the instructions further cause, during execution of the second query, a query optimizer using an index existing on the table column.

12. The non-transitory computer-readable medium of claim 10, wherein the second query includes a clone of the first expression that preserves hints for query optimization.

13. The non-transitory computer-readable medium of claim 10, wherein the second query includes a predicate, and wherein the predicate conjunctively joins a clone of the first expression with the second expression that is derived based on both the first expression and an access control policy.

14. The non-transitory computer-readable medium of claim 10, wherein the conditional expression returns null when the condition is not satisfied.

15. The non-transitory computer-readable medium of claim 10, wherein the first alias has a same name as the table column, and wherein the conditional expression returns null when the condition is not satisfied.

16. The non-transitory computer-readable medium of claim 10, wherein the conditional expression returns a value other than a value from the table column when the condition is not satisfied.

17. The non-transitory computer-readable medium of claim 10, wherein the third expression is a clone of the first expression, wherein the second query includes a predicate that conjunctively joins the third expression with the second expression, wherein the second expression is based on both the first expression and an access control policy, wherein the first alias has a same name as the table column.

18. The non-transitory computer-readable medium of claim 10, wherein the third expression is a clone of the first expression, wherein the second query includes a predicate that conjunctively joins the third expression with the second expression that is derived based on both the first expression and an access control policy, and wherein the conditional expression returns null when the condition is not satisfied.

* * * * *

UNITED STATES PATENT AND TRADEMARK OFFICE
CERTIFICATE OF CORRECTION

PATENT NO. : 9,886,481 B2  
APPLICATION NO. : 13/278095  
DATED : February 6, 2018  
INVENTOR(S) : Lei Page 1 of 1

It is certified that error appears in the above-identified patent and that said Letters Patent is hereby corrected as shown below:

In the Specification

In Column 5, Line 12, delete "FIG. A and FIG. B)." and insert -- FIG. 1A and FIG. 1B). --, therefor.

Signed and Sealed this
Twenty-first Day of August, 2018

Andrei Iancu
*Director of the United States Patent and Trademark Office*